July 24, 1928.                               1,677,972
E. S. MARKS
ELECTRICALLY ILLUMINATED ARTIFICIAL TREE
Filed Aug. 3, 1927
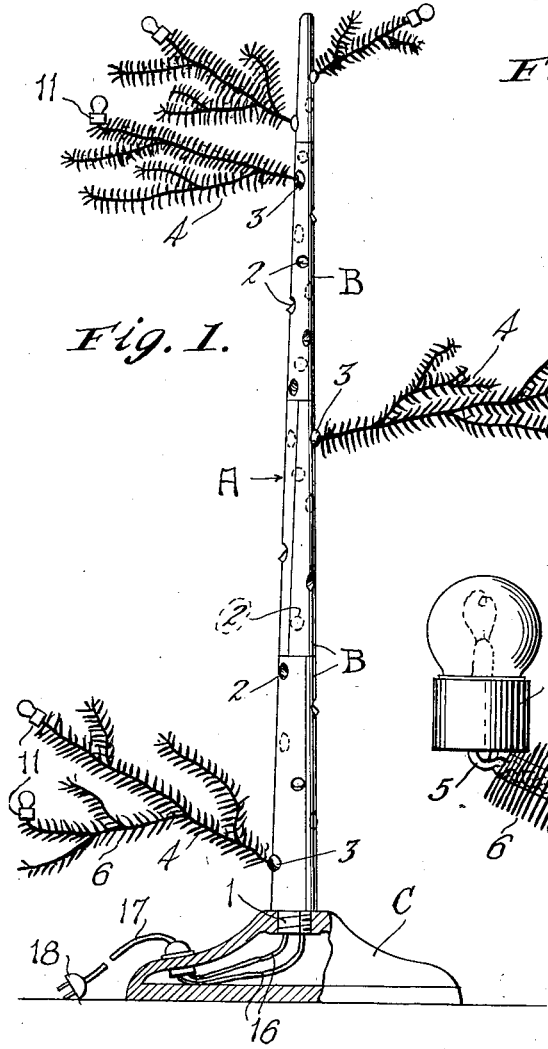
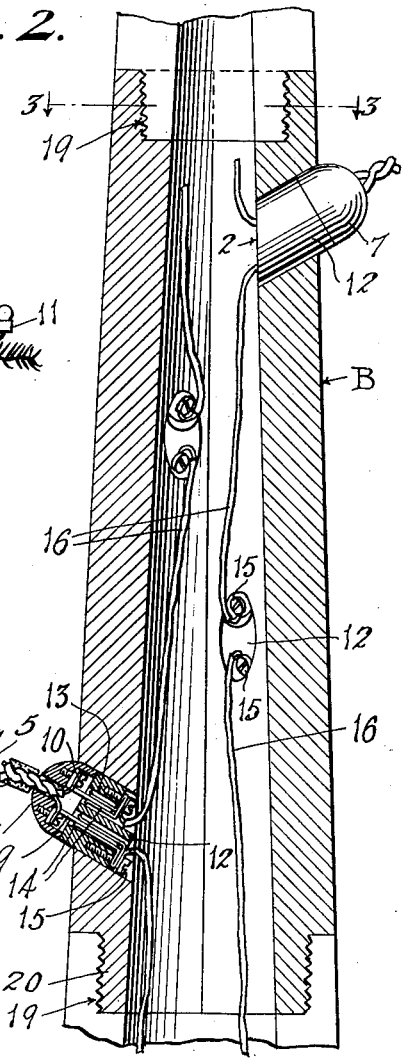
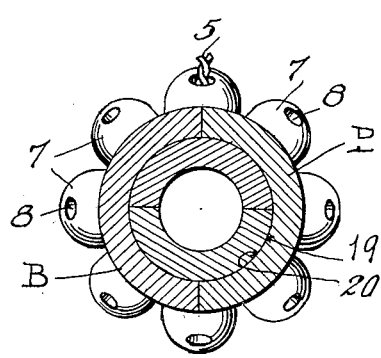
INVENTOR
Emanuel S. Marks,
BY
ATTORNEYS.

Patented July 24, 1928.

1,677,972

UNITED STATES PATENT OFFICE.

EMANUEL S. MARKS, OF BROOKLYN, NEW YORK.

ELECTRICALLY-ILLUMINATED ARTIFICIAL TREE.

Application filed August 3, 1927. Serial No. 210,245.

This invention contemplates the provision of an artificial tree, particularly a Christmas tree, which has electrical lighting apparatus built therein or forming a part thereof, so that the necessity for stringing or hanging electric wires, lamp sockets, etc., over the branches of the tree with the resulting crude and inartistic appearance is eliminated.

Another object is to provide a "knockdown" tree wherein the trunk comprises a plurality of separably connected parts and the branches or limbs are removable from the trunk.

A further object is to provide such an artificial tree wherein the branches or limbs are formed of wires which also serve as electrical conductors in the lighting circuit and have electric lamp sockets attached thereto.

Other objects are to provide an artificial tree of the character described in which the trunk has mounted therein a plurality of electrical outlet fixtures or sockets connected in a circuit, and the branches have connected thereto electric plugs to separably engage said outlets, whereby said outlets and said plugs serve both to mount and support the branches on the trunk and to electrically connect said lamp sockets in the circuit; to provide such a construction which is simple and inexpensive, and to obtain other advantages and results as will be brought out by the following description.

Referring to the accompanying drawings, in which corresponding and like parts are designated throughout the several views by the same reference characters, Figure 1 is a side elevation of an artificial tree embodying my invention, with some of the branches removed to more clearly illustrate the details of construction;

Figure 2 is an enlarged fragmentary transverse vertical sectional view through a portion of the tree, and Figure 3 is a horizontal sectional view, taken on the line 3—3 of Figure 2.

Specifically describing the illustrated embodiment of the invention, the reference character A designates the trunk portion of the tree which is formed of a plurality of axially alined separably connected sections B, the lower one of which is separably connected in any suitable manner as by screw threads, as indicated at 1, to a base C. The trunk portion A is preferably hollow and has secured in its walls a plurality of electrical connector outlet elements 2 which are spaced vertically and circumferentially of the trunk portion, and with which cooperate electrical connector plug elements 3, one at one end of each of the branches 4.

The branches 4 are formed of stiff insulated wires 5 to which is attached in any suitable manner material 6 for simulating the foliage of the tree. For example, the material 6 may be shreds of paper which are spun upon the wires 5 to simulate the needles of a pine tree. The wires 5 are mechanically and electrically connected to the plug elements 3 which may be of any suitable construction. As shown, these plug elements consist of a body 7 of insulating material having a central opening 8 through which pass the wires 5, contact prongs 9 being secured to the body 7 in any suitable manner as by the screws 10 which may also serve to fasten the wires 5 to said prongs. At any suitable point on the branch 4 is mounted an electric lamp socket 11 of known construction which is also electrically connected to the wires 5 so as to be in circuit therewith. The electrical connection of the wire to the socket also serves to hold the socket on the branch 4.

The outlet elements 2 on the trunk of course are of a construction to cooperate with the plug elements 3, and as shown may each comprise a body 12 of insulation having longitudinal openings 13 therethrough in which are arranged spring contact members 14 secured to the body 12 by screws 15. The spring contact members are connected in an electric circuit by wires 16 extending along the interior walls of the trunk portion A. The plug elements 3 are connected to the outlet elements in the usual manner, that is, by inserting the prongs 9 into the spring contact members 14 by a longitudinal push. The outlet members 2 and plug elements 3 thus serve both to support the respective branches 4 on the trunk portion A and to electrically connect the wires 5 with the wires 16. The wires 16 are connected at the base of the tree to an extension cord or the like 17 to which is attached an electrical connecting plug 18 for connecting the circuit to a source of electricity.

To facilitate in wiring the outlet elements 2, the sections B of the trunk portion are longitudinally divided into two parts which are adapted to be arranged with their edges in abutting relation and be held together by the means connecting the sections to each other, or said parts may be connected together by any other suitable means. As shown, each of the sections B has an interiorly threaded end 19 which receives the exteriorly threaded end 20 of the next adjacent section, although any other suitable means for connecting said section may be utilized.

The outlet elements 2 should of course be located on the trunk portion so that the branches will be located in close simulation to the branches of a natural tree, and I have found that by arranging the outlet elements in a double helix, the branches may be very realistically arranged on the trunk portion.

Obviously it is within the scope of the invention to form the bodies of the limbs or branches 4 of any suitable material, for example a tubular material, and arrange the wires 5 within the branches, or the wires might be exteriorly mechanically connected to the body portions of the branches. The invention is susceptible of embodiment in many other details of construction, and therefore I do not desire to be understood as limiting myself except as required by the following claims when construed in the light of the prior art.

Having thus described the invention, what I claim is:

1. An artificial electrically illuminated tree, comprising a trunk portion, a plurality of electric outlet fixtures mounted therein, means for connecting all of said fixtures in an electric circuit, a plurality of branches each having electric wires extending therethrough, an electric connector element to separately fit any of said outlet fixtures and electrically connected to said wires, and a lamp socket electrically connected to said wires.

2. An artificial electrically illuminated tree, comprising a hollow trunk portion, a plurality of electric outlet fixtures mounted therein, means for connecting all of said fixtures in an electric circuit, a plurality of branches, electric circuit wires arranged within said trunk and said branches, lamp sockets mounted on said branches and electrically connected to said circuit wires, and means for electrically connecting said circuit wires to a source of electricity.

3. An artificial electrically illuminated tree, comprising a trunk portion, a plurality of electric outlet fixtures mounted therein, means for connecting all of said fixtures in an electric circuit, a plurality of branches each comprising wires having suitable material attached thereto to simulate the foliage of a tree, each of said branches having at one end thereof an electrical connector element to separably engage any of said outlets on the trunk and electrically connected to said wires so that said outlets and said connector elements cooperate to support the respective branches on the trunk and to connect the wires of the respective branches in said circuit, and lamp sockets mounted on said branches and electrically connected to the wires therein.

4. An artificial electrically illuminated tree, comprising a hollow trunk portion divided transversely into a plurality of sections each of which is longitudinally divided into a plurality of parts, means for separably connecting the parts of the respective sections and for separably connecting said sections together, a plurality of electrical connector outlet elements secured in said sections, wires extending through said sections to connect said electrical connector elements in a circuit, a plurality of branches, electrical circuit wires arranged within said branches, an electrical connector element to separably engage any of said outlet elements secured to each of said branches and electrically connected to said circuit wires in said branches, and lamp sockets mounted upon said branches and electrically connected to said circuit wires therein.

5. An artificial tree comprising a trunk portion formed of a plurality of sections, means for separably connecting said sections, a plurality of branches, and separably cooperating plug and socket members on said trunk portion and said branches for separably mounting said branches upon said trunk.

6. An artificial tree comprising a trunk portion, a plurality of branches projecting laterally therefrom, electric wires through said branches, lamp sockets on said branches electrically connected to said wires, electric circuit wires within said trunk portion connected to said branch wires, and means for connecting said electric circuit wires to a source of electricity.

EMANUEL S. MARKS.